US008296169B2

(12) United States Patent  
Wall et al.

(10) Patent No.: US 8,296,169 B2
(45) Date of Patent: *Oct. 23, 2012

(54) COMPUTER METHOD AND APPARATUS FOR INDICATING PERFORMANCE OF ASSETS AND REVISIONS HELD IN A REPOSITORY (75) Inventors: Matthew B. Wall, Cambridge, MA (US); Timothy R. Wall, Cambridge, MA (US)

(73) Assignee: Oculus Technologies Corporation, Boston, MA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 11/975,761

(22) Filed: Oct. 22, 2007

(65) Prior Publication Data

US 2009/0083101 A1 Mar. 26, 2009

Related U.S. Application Data (60) Provisional application No. 60/994,884, filed on Sep. 21, 2007, provisional application No. 60/994,831, filed on Sep. 21, 2007.

(51) Int. Cl.
G06Q 10/00 (2006.01)
(52) U.S. Cl. ..................... 705/7.11; 705/300
(58) Field of Classification Search .............. 705/7.11, 705/300
See application file for complete search history.

(56) References Cited

U.S. PATENT DOCUMENTS

| 6,223,343 B1 * | 4/2001 | Hopwood et al. ............ 717/101 |
| 6,460,052 B1 | 10/2002 | Thomas et al. |
| 6,564,246 B1 | 5/2003 | Varma et al. |
| 6,601,233 B1 | 7/2003 | Underwood |
| 6,636,242 B2 * | 10/2003 | Bowman-Amuah ........ 715/764 |
| 7,171,618 B2 | 1/2007 | Harrington et al. |
| 7,299,450 B2 | 11/2007 | Livshits et al. |
| 7,353,232 B1 | 4/2008 | Kalucha et al. |
| 7,401,031 B2 * | 7/2008 | Hughes ...................... 705/7.13 |
| 7,478,362 B2 * | 1/2009 | Gutz et al. .................. 717/104 |
| 7,788,295 B2 * | 8/2010 | Wall et al. .................. 707/804 |
| 7,818,663 B2 | 10/2010 | Khaba |
| 7,904,885 B2 | 3/2011 | Volkmer |
| 7,953,847 B2 * | 5/2011 | Grelewicz et al. ........... 709/224 |
| 2002/0118222 A1 * | 8/2002 | Fogarty ...................... 345/741 |
| 2002/0188597 A1 | 12/2002 | Kern et al. |

(Continued)

OTHER PUBLICATIONS

"AccuRev 4.6 Software Configuration Management" Data Sheet, 2 pages. 2008.

(Continued)

*Primary Examiner* — Mark A Fleischer
(74) *Attorney, Agent, or Firm* — Hamilton, Brook, Smith & Reynolds, P.C.

(57) ABSTRACT

Computer method and apparatus managing engineering product revisions. A repository holds one or more assets. For each asset, the repository holds respective revisions of the asset. A revision manager tracks changes of state of assets of the repository. Each change of state of a given asset results in a respective revision of the given asset. The revision manager provides a project view illustrating changes of state of assets and including performance indicators corresponding to respective changes of state of assets held in the repository. The performance indicators may be color coded and may be based on a changeable metric. The revision manager provides in the project view an indication of each change in metric. Plural performance indicators for a set of assets may be presented in the project view as a graphical series.

17 Claims, 7 Drawing Sheets

U.S. PATENT DOCUMENTS

| | | | |
|---|---|---|---|
| 2003/0172368 A1* | 9/2003 | Alumbaugh et al. | 717/106 |
| 2004/0117759 A1 | 6/2004 | Rippert et al. | |
| 2005/0114829 A1 | 5/2005 | Robin et al. | |
| 2005/0138150 A1 | 6/2005 | Bhasker et al. | |
| 2005/0228829 A1 | 10/2005 | Richards et al. | |
| 2006/0235732 A1 | 10/2006 | Miller et al. | |
| 2007/0220479 A1* | 9/2007 | Hughes | 717/100 |
| 2008/0034013 A1 | 2/2008 | Cisler et al. | |
| 2008/0313596 A1* | 12/2008 | Kreamer et al. | 717/101 |
| 2009/0083102 A1 | 3/2009 | Wall et al. | |
| 2009/0083165 A1 | 3/2009 | Wall et al. | |
| 2009/0083343 A1 | 3/2009 | Wall et al. | |

OTHER PUBLICATIONS

"Software Configuration Management—SCM—from AccuRev" 1 page, retrieved from the World Wide Web on Mar. 12, 2008 http://accurev.com/.

"Google SVN Time-Lapse View", 6 pages, retrieved from World Wide Web on Mar. 10, 2008 http://code.google.com/p/svn-time-lapse-view/.

"Jon Aquino's Mental Garden", 5 pages, Oct. 16, 2007; retrieved from the World Wide Web on Mar. 10, 2008 http://jonaquino.blogspot.com/2007/1/sven-time-lapse-view.html.

"IBM Rational ClearCase" 4 pages, Mar. 2007 http://ibm.com/software/rational/offerings/scm.html.

"Rational ClearCase", 2 pages, retrieved from the World Wide Web on Mar. 12, 2008 http://www-306.ibm.com/software/awdtools/clearcase/.

"SmartSVN—Subversion/SVN Client: Highlights", 4 pages, retrieved from the World Wide Web on Mar. 11, 2008 http://www.syntevo.com/smartsvn/features.html.

"SmartSVN—the Easy-to-use Subversion Client" *SyntEvo GmbH*.. 2 pages, 2005-2007 http://syntevo.com.

"The Coolest Interface to (Sub)Version Control" 4 pages, retrieved from the World Wide Web Mar. 12, 2008 http://tortoisesvn.net/.

"ViewVC: Repository Browsing", 2 pages., retrieved from World Wide Web on Mar. 12, 2008 http://viewvc.org/.

Office Action for U.S. Appl. No. 11/975,759, mailing date: Nov. 10, 2010.

From Wikipedia, the free encyclopedia, "Revision control" downloaded from http://web.archive.org/web/20060920042802/http://en.wikipedia.org/wiki/Revision_control (1 of 8) on Mar. 23, 2011 at 10:35:30 PM from web pages as of Sep. 13, 2006.

Stefan Kung, et al., "TortoiseSVN A Subversion client for Windows Version 1.3.5", Sep. 26, 2006, online publish, [retrieved on Mar. 16, 2011], Retrieved from the Internet:<URL:http://sourceforge.netiprojects/tortoisesvn/files1Documentation/1.3.5/>, pp. 1-136.

William Nagel, "Subversion Version Control: Using the Subversion Version Control System in Development Projects", May 16, 2005, Prentice Hall, [retrieved on Mar. 16, 2011], Retrieved from the Internet <URL:http://academic.safaribooksonline.com/0131855182>, pp. 1-26.

Horvath et al., "Adaptive Objects for Behavior Based Product Models," *IEEE*, vol. 1, pp. 651-656 (Jan. 10, 2006).

Purvis et al., "A Group Collaboration Tool for Software Engineering Products," *IEEE*, pp. 362-369 (Aug. 6, 2002).

Non-Final Office Action for U.S. Appl. No. 11/975,758; Date Mailed: Jan. 28, 2010.

Notice of Allowance for U.S. Appl. No. 11/975,758; Date Mailed: May 24, 2010.

\* cited by examiner

COMPUTER METHOD AND APPARATUS FOR INDICATING PERFORMANCE OF ASSETS AND REVISIONS HELD IN A REPOSITORY

RELATED APPLICATIONS

This application claims the benefit of U.S. Provisional Application No. 60/994,884, filed on Sep. 21, 2007 and U.S. Provisional Application No. 60/994,831 filed on Sep. 21, 2007. The entire teachings of the above application(s) are incorporated herein by reference.

BACKGROUND OF THE INVENTION

Engineering is often a collaborative effort. For example, a software development project requires a team of designers, developers, testers, and management. Other engineering projects have similar teams of project members. Tools for supporting and managing the team include integrated development environments for individual activities as well as collaborative tools for communicating about and/or sharing data.

Attempts have been made to codify and/or standardize engineering processes. Examples in software development include the Unified Modeling Language (UML) and other visual modeling languages. Such visual modeling languages have formal syntax and semantics for communicating a model or conceptualization. In general, at the modeling level a "problem" is posed in terms of a customer's needs and requirements and may be referred to as the business problem system. The software designer develops a "solution" software product and/or services that address the problem. The visual modeling language syntax enables software designers to express (specify and document) the subject problems and solutions in a standardized manner, while the semantics enable knowledge about the subject problem system to be captured and leveraged during the problem solving phase. As such, the visual modeling language enables the sharing of information (including prior solution portions) and extension (without reimplementation) of core object oriented concepts (analysis and design) during the iterative problem-solving process for designing software products.

Attempts have been made to formalize the capture of artifacts used to create engineered products, whether the products are electro-mechanical systems or software applications. In many engineering environments, these systems are referred to as product data management (PDM) systems. In software development, these are often referred to as revision (or version) management systems. Typically these systems serve as a vault or storage system that captures changes to a product design over time.

Most revision management systems include the notions of a repository and a working copy. The repository is the vault in which all changes are recorded. The working copy is a snapshot of a specific state in time, copied to a work space in which an engineer can work on it. Typically a working (workspace) copy of a file (or asset in general) from the storage is shown with changes relative to the repository (stored) copy but not vice versa. "TortoiseSVN", an open source engineering tool, is an example.

SUMMARY OF THE INVENTION

The present invention addresses the disadvantages and concerns of the prior art. In particular, the present invention provides in a project screen view, of an engineering product revision management system, performance indicators for asset revisions held in a repository. In one embodiment, the project screen view shows branches, tags, commit points, a trunk and performance indicators of assets. Each branch represents a respective hierarchy or set of assets. Each tag represents a hierarchy or set of assets at a specific state. The performance indicators correspond to tagged states of assets. In accordance with the present invention, each of the branches, tags, commit points, trunk and performance indicators implement an access handle (link, hyperlink, or the like) to the asset or set of assets as held in a repository.

The user interface allows a user to interact with performance indicators of assets to affect operations on the assets. In one embodiment, a drag and drop interaction with a performance indicator relative to a source branch and a destination branch initiates a copy command (function). This effectively moves and copies assets in the repository in a convenient manner for the user.

In a preferred embodiment, computer apparatus, method and system of the present invention includes a repository holding one or more assets and a revision manager tracking changes of state of the assets of the repository. Each change in state of a given asset results in a respective revision of the given asset. The revisions are included in the repository. The revision manager provides one or more screen views illustrating changes of state of assets. At least one screen view (e.g., a project view) includes performance indicators corresponding to respective changes of state (revisions) of assets. The performance indicators may be color coded and may be based on a changeable metric. The revision manager provides in the at least one screen view an indication of each change in metric. Where a given set of assets has plural performance indicators for the set of assets, the revision manager graphically displays the performance indicators as a series, such as a column of such indicators.

Accordingly the present invention provides performance indicators for sets of assets/revisions in an engineering product revision management system as heretofore unachieved by the prior art.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
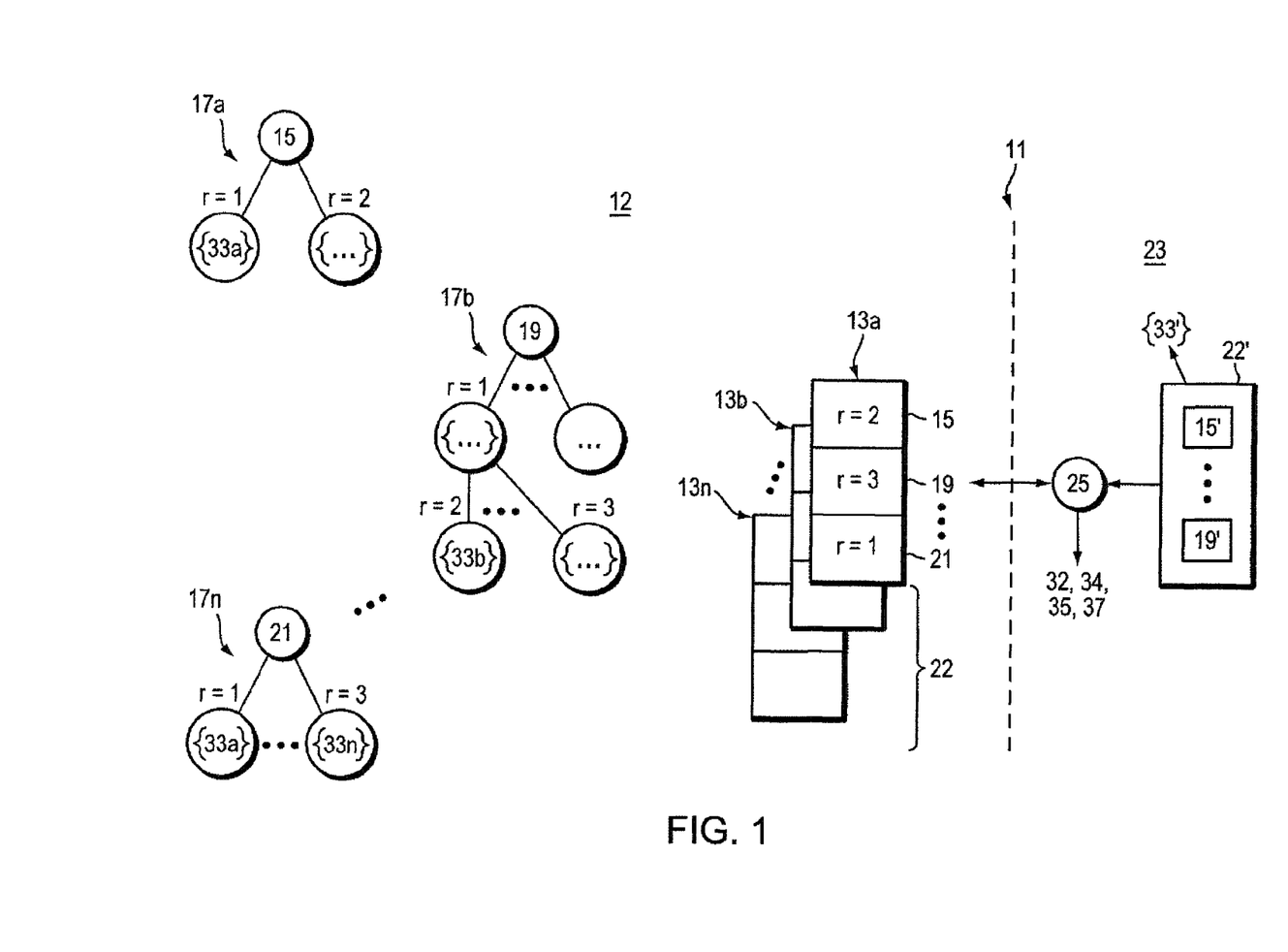
FIG. 1 is a schematic view of an engineered product management system of the present invention.

Illustrated in FIG. 1 is an engineering product management system 11 embodying the present invention. One example is a software configuration management system but management systems of other engineering products are suitable. Engineering Product management system 11 provides a work space 23 view of a set of assets (generally engineered product) 13. This engineered product 13 is formed of one or more assets 15, 19, 21. Each asset 15, 19, 21 has respective versions or revisions, typically referenced by a revision number. Different sets 22 of assets forming the different versions 13a, b . . . n of the engineered product 13 employ respective revisions of the assets 15, 19, 21. One of the illustrated versions (sets of assets 22) of engineered product referenced 13a in FIG. 1 is formed of revision r=2 of asset 15, revision r=3 of asset 19 and revision r=1 of asset 21. Other versions 22 of subject engineered product 13 use other revisions of assets 15, 19, 21.

Each version (set of assets) 22 of an engineered product 13 has a state. For a given state, every asset 15, 19, 21 in the set 22 has a location in space (repository 12 further described below) and in time defining the state. Representation of asset location in memory follows the format:

```
Protocol://[[username [:pw]@] host [:port]]/dir../asset [@r]
Where "Protocol" is for example  http:
                                 https:
                                 svntssn:
                                 svn:
                                 or ftp:
    Username [:pw] is an enduser login or system name and password,
    host [:port] is a local or remote server name and port number,
    /dir (first occurrence) is the root and parent (i.e., uppermost
level directory) name, and
    /asset [@ r] is the name of the subject asset and revision number r.
```

Each asset 15, 19, 21 has a set of revision numbers r. Each revision number designates a specific state of the asset within the repository 12.

Common examples of assets are files and directories containing diagrams or drawings, engineering specifications, source code of a software program, requirements documentation, system models, system tests and so forth. A significant state of an asset is saved as a revision of that asset, and the sets of revisions (states) of a given asset are stored in a tree or similar searchable data structure 17. Asset revision trees 17 and assets 15, 19, 21 are held in a repository 12 illustrated to the left side of the dashed lines in FIG. 1. Thus, FIG. 1 illustrates an asset revision tree 17a for asset 15, asset revision tree 17b for asset 19 and asset revision tree 17n for asset 21.

When an engineer or collaboration team member makes changes to an asset 15, 19, 21, the set of changes 33 is recorded in respective asset revision tree 17. In particular, a change set 33 lists the modifications made to respective assets in one state to arrive at the next immediate state of the assets. A change set 33 may be as short as a listing of changes (one or more) made to one file (asset) or as expansive as respective listings of changes made to many assets. The asset revision trees 17 are maintained in this way for each version 22 of engineered product 13a, b, c.

Specifically, engineered product management system 11 enables users to produce and work with (edit, test, redesign, etc.) different configurations or versions 22 of subject engineered product 13. The engineering product management system 11 utilizes a revision manager 25 to manage the revisions made to each asset 15, 19, 21 and the resulting revised assets thereof. Changes to assets 15, 19, 21 are made in the context of workspace 23. The workspace 23 identifies the local changes (change set 33') currently being performed to a version 22' of engineered product 13 (its assets 15' and 19' for example) of that workspace. When the local changes 33' are completed and accepted or otherwise saved by the users, the revision manager 25 records in respective asset revision trees 17 the resulting new revised asset or asset revisions and the corresponding changes (change sets) 33a, b, . . . n.

In a preferred embodiment, the revision manager 25 operates as a tracking tool tracking changes 33, 33' for assets 15, 19, 21 and hence tracking changes of state and corresponding resulting revisions of assets. As such, the revision manager 25 is able to provide (produce) various screen views that are helpful to end users or project team members working on sets of assets 15, 19, 21. In one embodiment, there are four particular views generated by the revision manager 25, namely a working copy view 32, a file history view 34, a project view 35 and a repository (or per asset timeline) view 37.

With the working copy view 32, the revision manager 25 enables a user to view status information of an asset 15, 19, 21. For the subject asset, there is a working copy and a repository copy. The revision manager 25 establishes the working copy 15', 19' upon the user checking out the asset 15, 19, 21 from the repository 12 and placing the asset (a working copy 15', 19' thereof) in user workspace 23 on a local drive for example. In the working copy view 32, the revision manager shows the asset working copy 15', 19' relative to the corresponding repository copy 15, 19 and vice versa. This is accomplished using the cache or other stored collection of changes 33' to the working (i.e., workspace 23) copy 15', 19' and the changes 33 associated with the repository copy 15, 19. In a preferred embodiment, the revision manager 25 provides real time display of changes 33, 33' in both of these directions, i.e., relative to working copy and relative to repository copy.

Further, repository manager 25 provides a file history view 34 showing the log of change messages 33 for a single asset. Version history tables 17 support this view 34. Additional details of one embodiment of the file history view 34 and working copy view 32 are disclosed in U.S. Provisional Patent Application 60/994,720 filed Sep. 21, 2007 for "Computer Method and Apparatus for Software Revision Management", incorporated herein by reference. The repository per asset timeline view 37 is detailed in U.S. Provisional Patent Application No. 60/994,884 filed Sep. 21, 2007 and in U.S. patent application Ser. No. 11/975,758 by assignee. The project view 35 is also detailed in U.S. Provisional Patent Application No. 60/994,884 filed Sep. 21, 2007 by assignee and herein incorporated by reference. Germane to the present invention is the project view 35 discussed next with reference to FIGS. 2a-2c and 5.

By way of background, in prior art engineering product management systems, branches (hierarchies) of assets are typically shown as vertices. In contrast, the present invention project view 35 (FIG. 2a-2c) uses lines to indicate branches and subbranches of assets and further illustrates relationships of the branches to a trunk as heretofore unavailed by the prior art. The illustrated relationships represent dependencies between assets and branches/subbranches comprising the assets.

In addition, the prior art systems do not illustrate asset state changes or a time order of asset revisions. Further, illustrations in the prior art systems are typically only on a per asset basis, not whole sets of assets as needed/wanted in team projects and complex software or engineering product configurations. In stark contrast, the project view 35 and repository view 37 of the present invention enable users to see asset state changes and a time view of asset revisions for whole sets of assets. In some embodiments, there are functions and operations that affect whole groups of assets. For example, performance indicators may be associated with groups of assets. The performance indicator then indicates how well the group of assets performed at the subject state. Another example is the copy function which allows groups of assets to be copied together at a time where the subject group is the function parameter (instead of individual assets of the group separately being parameters to the copy function).

Further in shared file systems, file servers provide to users only a way to look at contents (files) in space. In a repository system, such as repository 12, one is concerned about space and time aspects of assets. So there exists a need to show a timeline of asset changes 33 and the corresponding resulting revisions (versions). In a single network diagram, revision manager 25 of the present invention displays both a timeline view of assets and changes 33 to state of an asset. This graphical display of the history of changes 33 to sets of assets in engineering product management system 11 is called the project view 35 and is described with reference to FIGS. 2a through 2c below.

Figure 2A:
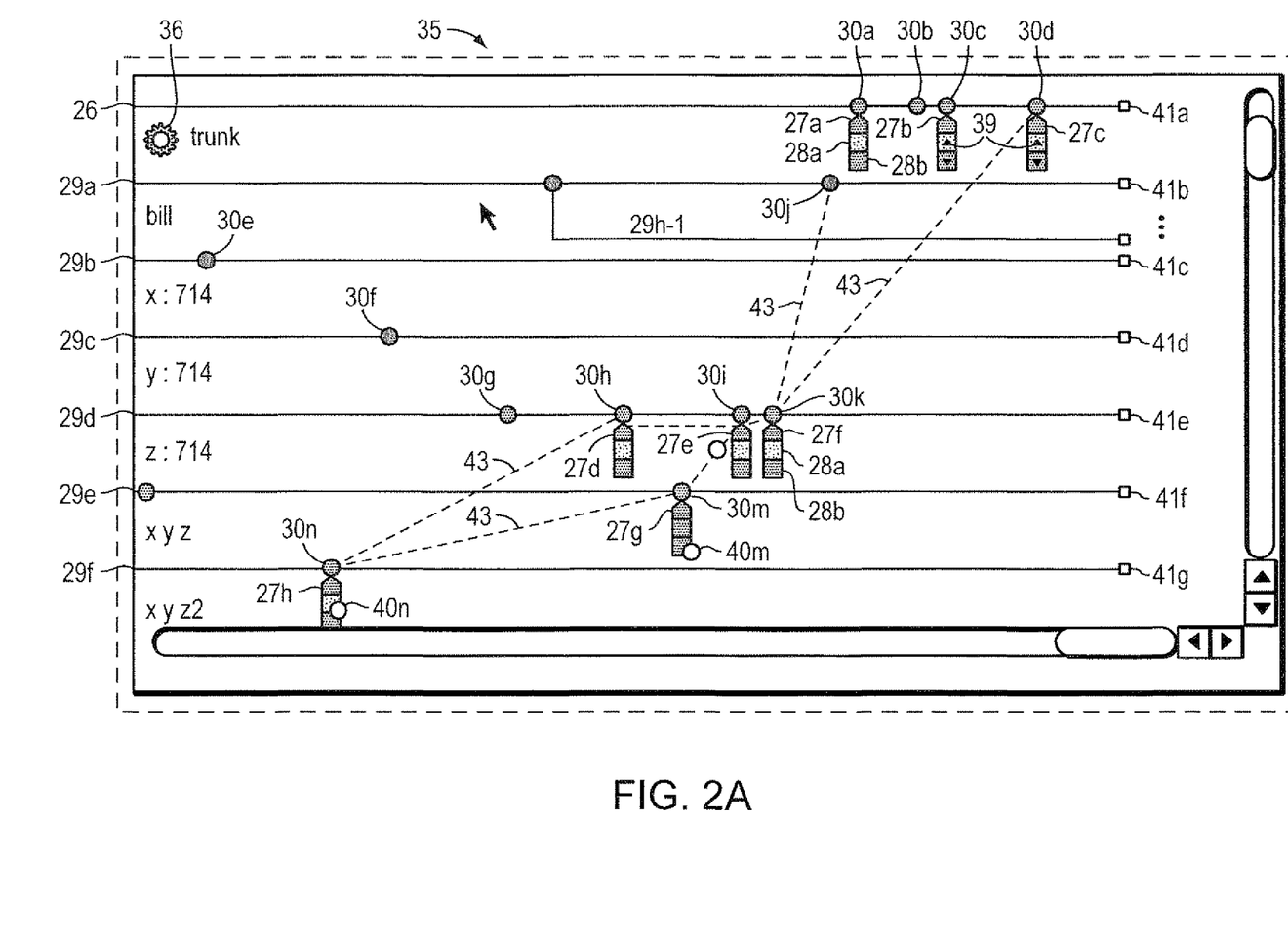
FIG. 2a is a schematic view of a project screen view of the engineered product management system of FIG. 1 embodying the present invention.
Figure 2B:
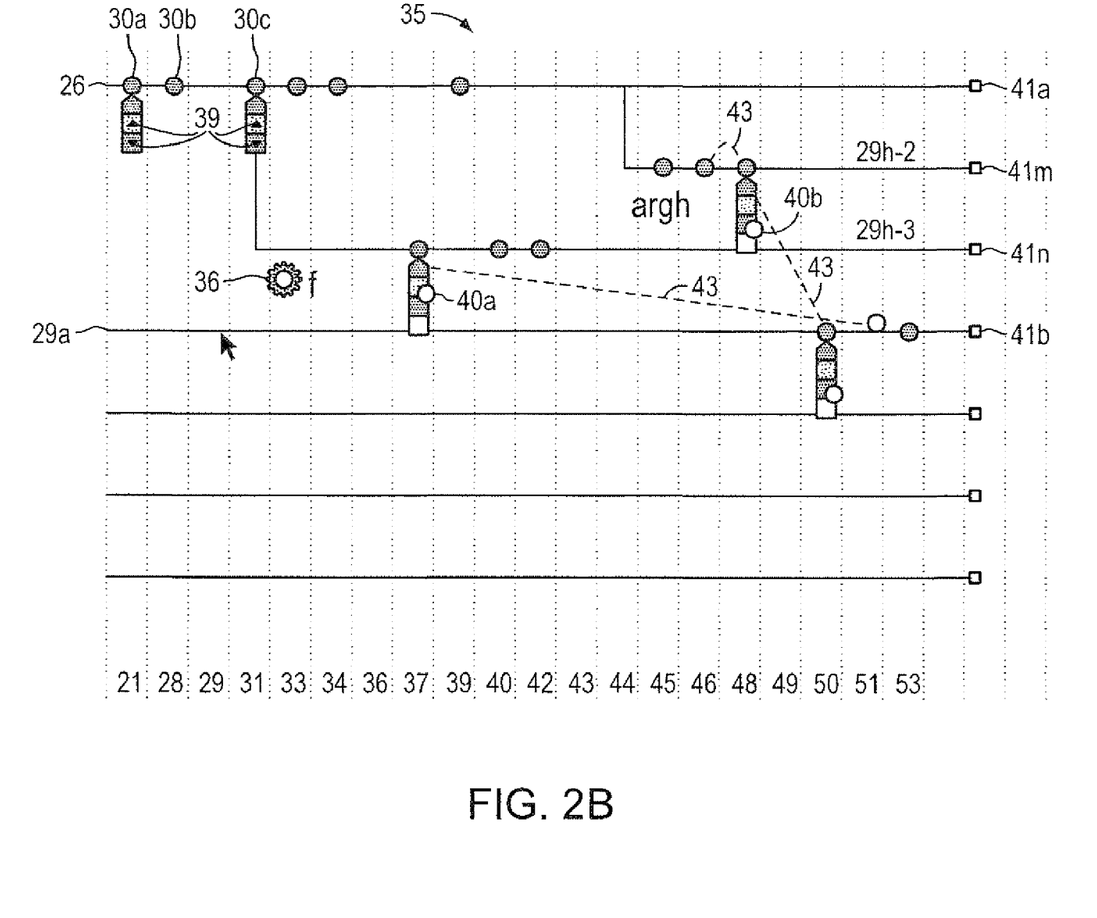
FIG. 2b illustrates the invention system project screen view in sequential mode.
Figure 2C:
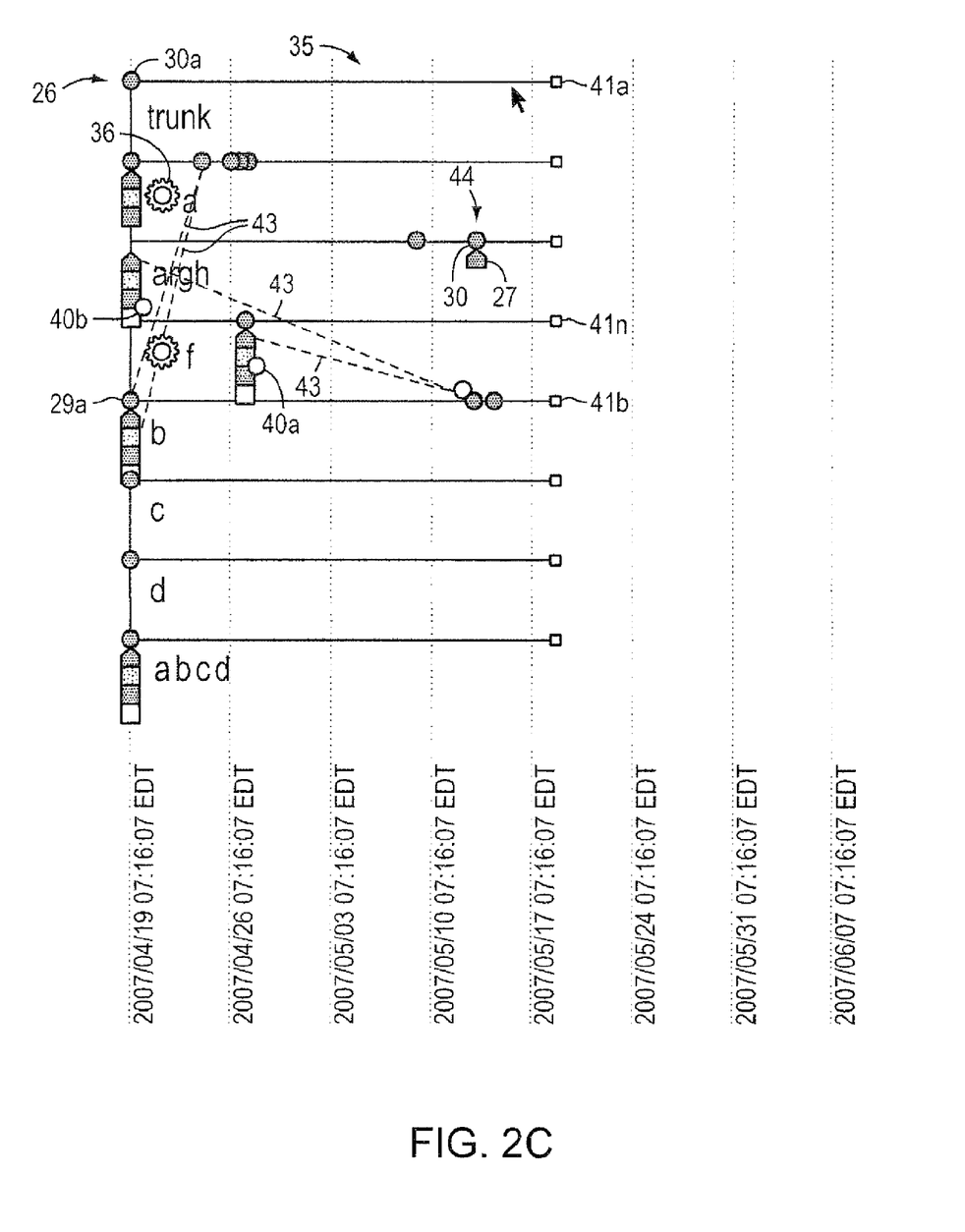
FIG. 2c illustrates the invention system project screen view in temporal mode.

The project view 35 displays a trunk 26, branches 29a . . . n, state changes 30a . . . n of assets and tags 27a . . . n involved in an engineered product project along with various graphic indicators 28, 36, 39, 40. There are numerous configurations that each of these elements can achieve. For each user (project member) there is a respective branch 29 and corresponding subbranches 29h. Each of these branches 29/subbranches 29h are shown below trunk 26 in a manner illustrating their relationship to trunk 26. Each change of state of an asset is rendered as a grey dot 30 along a pertinent branch (of a respective user). Each grey dot 30 coupled with a respective tag 27 represents a point at which the resulting revision/version of an asset is committed and available for use by users. The project view 35 has two scaling modes: temporal and sequential as illustrated in FIGS. 2b and 2c. In sequential mode (FIG. 2b), the left to right increments correspond to changes in state and thus sequence of revisions. This is illustrated by grid lines aligning with commit points 30. In temporal mode (FIG. 2c), the left to right increments correspond to steps in time, thus the grid lines do not often align with commit points 30 in that viewing. Both modes show both types of changes (i.e., sequential changes to state and order of changes over time).

As illustrated in FIGS. 2a-2c, there is a respective horizontal line, (branch 29 and associated/related subbranches 29h) per user indicating a hierarchy of assets being worked on by the user. There may be a subbranch 29h for each variation or concept by the user. Each branch/subbranch 29 may be labeled to indicate the respective user.

At the top of project view 35 is the trunk line 26. The spatial layout of the branches 29 relative to trunk 26 illustrate the dependencies between branches 29/subbranches 29h and assets/versions of those branches 29. A copy of an asset is indicated by a dashed line copy path 43 from the starting or source asset. The asset copy and the source asset are represented by respective circles, each being named the same (but with different revision number and repository memory location) in recognition of the copy relationship. The point of intersection of a branch line 29 and a subbranch 29h (or a branch 29/subbranch 29h and a copy path 43) indicates the state of the subject asset(s) affected. That is, a copy of the subject asset(s) at that state (at the time corresponding to the point of intersection of lines 29, 29h, 43) is used in the respective resulting subbranch 29h or copy path 43 destination.

Trunk 26 and each branch 29 are said to contain the respective hierarchy of assets. Each trunk/branch line 29 is a handle to the asset hierarchy as stored in repository 12. This handle is implemented using a hyperlink or similar technology and following the format for asset location in memory described above. Preferably the trunk line 26 is a link (hyperlink) to the file directories of the asset hierarchy (using repository memory location detailed above) and thus serves as the "root" for the displayed project.

As mentioned above, in one embodiment, the project view 35 employs grey dots (filled circles) 30 to indicate state changes of assets, and a tag 27 coupled to a grey dot 30 to indicate when a change of state is sufficiently committed to for other users purposes. Preferably tags 27 are graphically represented by a pentagon shaped symbol. Other geometric shapes (polygons) or symbols are suitable for representing tags 27. Once created, tags 27 are typically read-only in some embodiments.

Each of the so called commit points 30 represents a change of state to one or more assets at that point in time. The enumeration of changes is called a change set 33. In a preferred embodiment, the change set is implemented as a list 33. The list of changes 33 is recorded for or at a specific version of an asset in repository 12 as illustrated in FIG. 1. The displayed commit point 30 preferably is a handle to change set or list 33 using hyperlink or other suitable technology. The list contains the path of each item that was modified (e.g., svn+ssh://host/repo/dir/file.txt) as well as an indication of what kind of change was made (e.g., added, removed, modified). This list of changes 33 is commonly known as a change set, but is also referred to as change paths.

In one embodiment, user selection (through a graphical user interface) of a commit point 30 operates to generate a query of the repository 12 for change sets 33 of the asset corresponding to the selected commit point 30. The repository 12 is configured (e.g. using database technology) to respond to the query and returns a corresponding file storing the change sets 33 of the asset. This is accomplished by the repository 12 following the corresponding asset memory location given in the hyperlink of the selected commit point 30 and the path given in the respective change set list 33 stored at that asset memory location.

Preferably tags 27 operate similarly to commit points 30 as handles (links, hyperlinks and the like) to corresponding assets (revisions) as held in repository 12, i.e., the repository copy of the subject asset/revision. Given that tags 27 and commit points 30 operate as handles to repository-based one or more assets, the present invention also enhances the "copy asset" and "move asset" operations in project view 35.

Upon a user "dragging and dropping" (or otherwise initiating a select and move command or a select and copy command on) a commit point 30 or a tag 27 from one branch 29/trunk 26 to another branch 29, the invention system 11 executes a copy or move operation on the corresponding asset(s) of the commit point 30/tag 27. Specifically, the one or more assets (that state or revision) corresponding to the subject commit point 30/tag 27 are moved and/or copied in repository 12 from the memory location of the asset at the source branch 29/trunk 26 to a memory location of the set of assets in the destination branch 29. The changes to state and supporting change sets 33 which form that revision of the moved/copied asset (revision) are merged with the destination branch assets. Revision manager 25 and system 11 update corresponding revision logs 17 and repository 12 accordingly. In this way, the copying and moving of whole sets of assets is conveniently initiated and accomplished in the user interface of project view 35.

The latest state of an asset or set of assets is represented by a head element 41. In a preferred embodiment, head 41 is implemented as a block (square) or circle at the distal end of each trunk 26/branch 29. A block shaped head indicates that the branch 29 is still viable, and a circle head indicates a deleted branch 29 in one embodiment. Each head 41 serves as or effectively is a handle for the trunk 26/branch 29 coupled thereto. The handle may be implemented using hyperlink or similar technology. Thus, selecting this handle is equivalent to requesting "the latest stuff" (includes workspace 23 changes 33'), which is not necessarily the same as requesting "the latest revision/version" committed to repository 12 where a revision/version is a specific state in the repository 12 as discussed above.

Each tag 27 may have one or more performance indicators 28 associated with it. Restated a performance rating may be associated with each change in state (revision) of an asset. The respective performance indicator 28 represents the performance rating. In one embodiment, each performance indicator 28 is represented by a colored block (square), each block being a single metric. Each metric may have one or more asset groups associated with it. The colors of the performance indicator 28 blocks correspond to the metric score. In that sense, the performance indicators are color coded in some embodiments. Arrows 39 (FIG. 2a) in the performance indictor 28 block indicate whether the metric score has gone up or down since the previous tag 27 with that metric. Thus in some embodiments, the performance indicators include an indication of relative performance metric score such that a performance indicator of one asset indicates a respective performance metric score relative to a performance metric score of another asset. Grey blocks in the performance indicator 28 blocks indicate a change to the preference curves used to generate the metric score.

Various performance metrics and performance calculations known in the art are suitable. Preferably a separate program procedure or function determines performance per asset revision (state change) and stores respective performance metric scores of asset revisions in repository 12. Similar to tags 27, using hyperlink or similar technology, performance indicators 28 operate as handles to respective assets/revisions (sets of) as held in repository 12. Copying and moving of assets can also be affected through associated performance indicators 28 using the same method described above for tags 27 and commit points 30.

Preferably revision manager 25 also provides in project view 35 indications 40 (FIG. 2a-2c) of annotations or comments by a user. The annotations may regard the performance score, performance metric used, change in performance score calculation parameters or factors and the like of performance indicators 28 and metric change indicators 39. The annotations may regard the corresponding asset/commit points 30 state of changes, copy path 43, dependencies and so forth. Upon a user interacting with an annotation indicator 40 according to the graphical user interface of project view 35, revision manager 25 displays or otherwise renders the text of the corresponding annotations and/or comments. Annotation or comment technology known in the art supports operation of annotation indicators 40.

In order to indicate the existence of a working copy 15', 19' of an asset or set of assets, project view 35 displays a working copy indicator 36. In a preferred embodiment, working copy indicator 36 is displayed next to the branch name from which the subject asset(s) were obtained (sourced). If there is more than one working copy 15', 19' of a subject asset/set of assets, then project view 35 displays a respective working copy indicator 36 for each working copy. For example, two working copy indicators 36 next to one (a same) branch name indicates that there exists two working copies 15', 19' of the same asset or set of assets.

Each working copy indicator 36 is a handle to the respective working copy 15', 19' in the user's workspace 23. The handle may be implemented using hyperlink or similar technology. The working copy indicator 36 provides a link to the working copy or a link to status information about the differences between a working copy 15', 19' and the trunk 26/branch 29/tag 27 from which it was checked out.

In some embodiments, the revision manager 25 creates the project view 35 as follows and illustrated in FIG. 5. The revision manager 25 starts with the data stored in version history tables 17 and the workspace 23 data of project users (step 61). In particular, revision manager 25 queries the repository 12 for logs 17 within a pertinent time period, and then queries the repository/logs based on asset names (to deduce copy paths 43 for example) or other revision aspects. The revision manager 25 then parses the data (step 63) and corresponds the resulting parsed pieces to respective graphical elements (head 41, branch 29, sub-branch 29h, tag 27, commit point 30, asset working copy 15', 19' and corresponding working copy indicators 36, etc.). Logic for deducing view elements from the history log data and workspace 23 data may also be employed. Preferably revision manager 25 applies color coding and a visual grammar (detailed later) to make these correspondences at step 63.

Revision manager 25 at step 67 adds performance indicators 28 and arrows 39 according to performance metric scores and performance rating information stored in repository 12. Step 67 also adds annotation indicators 40. Annotations by users are stored as free form, comment-type metadata and implemented using technology common in the art. Revision manager 25 also generates and places links (hyperlinks) for each pertinent element linking trunk 26, branches 29, commit points 30, tags 27 and/or performance indicators 28 of an asset to the respective repository copy of the asset/revision and linking branch heads 41 and working copy indicators 36 of an asset to the respective workspace 23 copy of the asset.

Next the revision manager 25 orders (step 65a, b) the determined graphical elements by time (for temporal mode of the project view 35, FIG. 2c) and/or by state i.e. sequence revisions (for sequential mode of the project view 35, FIG. 2b).

Continuing with FIG. 2b, project view 35 is rendered in sequential mode. In this mode, each grid (vertical) line is a point in the sequence of revisions. Thus, the grid lines are aligned with commit points 30 and are numbered with revision numbers (along the bottom of the figure). The revision numbers increase from left to right but not necessarily at a regular rate (not by a same amount from one grid line to the next).

FIG. 2c illustrates the project view 35 in temporal mode. Here the grid (vertical) lines demark respective points or moments in time, rather than the points in the sequence of asset revisions in FIG. 2b. In one embodiment, date and time stamps are used to label each gridline in project view 35 in temporal mode as shown in FIG. 2c.

Also at 44 in FIG. 2c is shown a commit point 30 with associated or coupled tag 27 but no metric blocks/performance indicators 28. In any mode (sequential or temporal), revision manager 25 may show commit points 30 in project view 35 coupled to zero or one tag 27, and tags 27 coupled to zero, one or more performance indicators 28.

There are two types of assets: containers and non-containers. Files are examples of non-container assets, for example, a spread sheet or a text document. Directories are examples of container assets. The branches 29/subbranches 29h and commit points 30 in project view 35 are each effectively a directory. If an asset is a container, then the branches 29/subbranches 29*h* and commit points 30 in project view 35 represent sets of changes where each branch 29 is effectively a directory. If the asset is a non-container asset, then the commit points 30 in project view 35 represent a single change to the asset.

Figure 5:
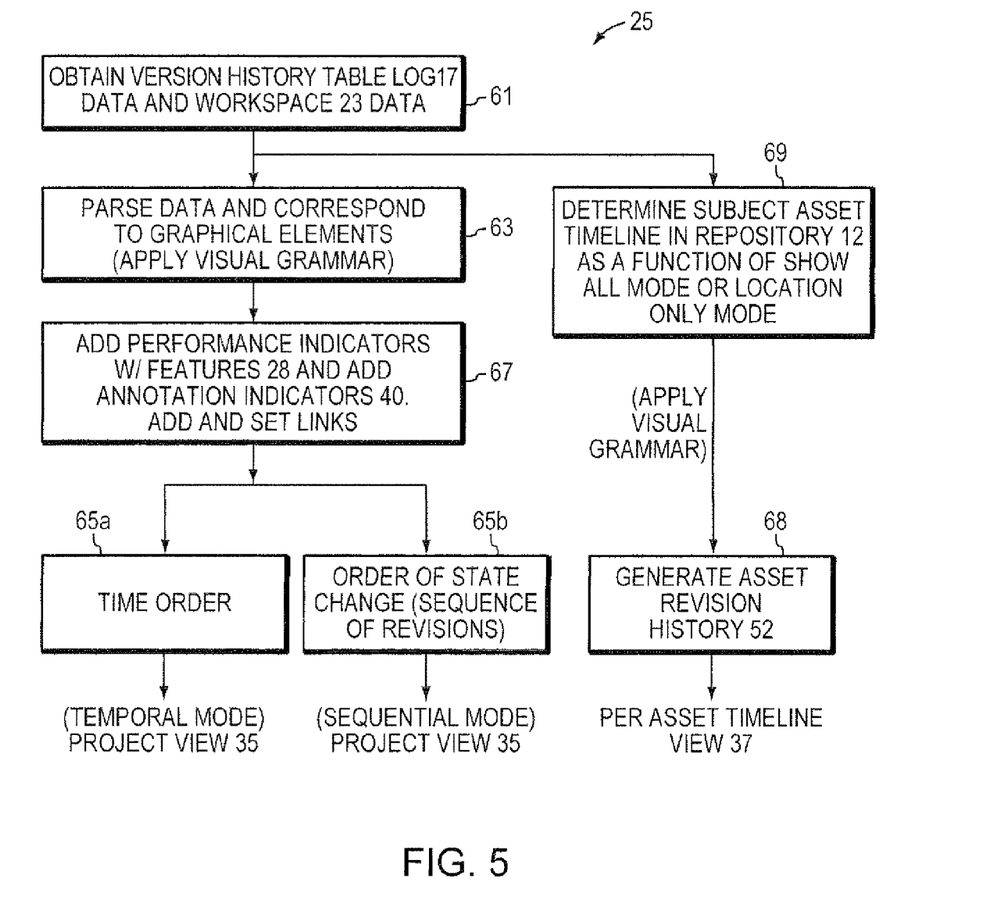
FIG. 5 is a flow diagram of a revision manager according to the present invention, in the engineered product management system of FIG. 1.

Revision manager 25 utilizes version history tables/logs 17 to determine asset timelines (step 69 FIG. 5) and to generate per asset timeline view 37 i.e., asset revision history 52 (step 68 FIG. 5). Revision manager 25 utilizes workspace 23 data to provide the current asset contents and head element 41 in per asset timeline view 37. Similar to step 67, revision manager at step 68 sets links/hyperlinks and the like for the asset revision and head 41 elements in revision history 52 (linking to respective repository 12 copy and workspace 23 working copy of the subject asset).

Accordingly throughout the project view 35 and repository view 37, the present invention employs a visual grammar, i.e., an enumeration of the different branch 29/subbranch 29*h* and tag 27 states and how the configuration manager 11/revision manager 25 will render them. The revision manger 25 is not the only sub-version client (working module), so there are a number of cases where the revision manager 25 must be able to display a repository 12 state even if the revision manager is not designed to put the repository 12 into that state. The visual grammar of the preferred embodiment is detailed in Appendix I.

Each case enumerated in Appendix I includes a brief description of the state, an image of what this state looks like graphically and svn command line examples of how the repository 12 can be put into the state for that case. In addition, each case may include SVN Log entries that correspond to the state.

Further, it is noted that each view 32, 34, 35, 37 (i.e., working copy view 32, file history view 34, project view 35 and repository/per asset timeline view 37) has a network memory location. The location is specified as a URL that uniquely locates an asset and uses the form

URL@NNN where the "URL" is the asset location in space and the "@NNN" is the asset location in time. The "@NNN" specifies at revision number NNN as common in the industry. Thus, the present invention views (i.e., working copy view 32, file history view 34, project view 35 and repository/per asset timeline view 37) provide a view into the repository 12 in both time and space, where in one embodiment the grey dots (in revision history/per asset time line view 37 and at 30 in FIGS. 2*a*-2*c*) represent past revisions/versions of an asset and the unfilled rectangle heads 41 represent the current (workspace 23) asset revision contents. In the prior art, only a view into the file server in space was provided and not a view in time and space as in the present invention.

Figure 3:
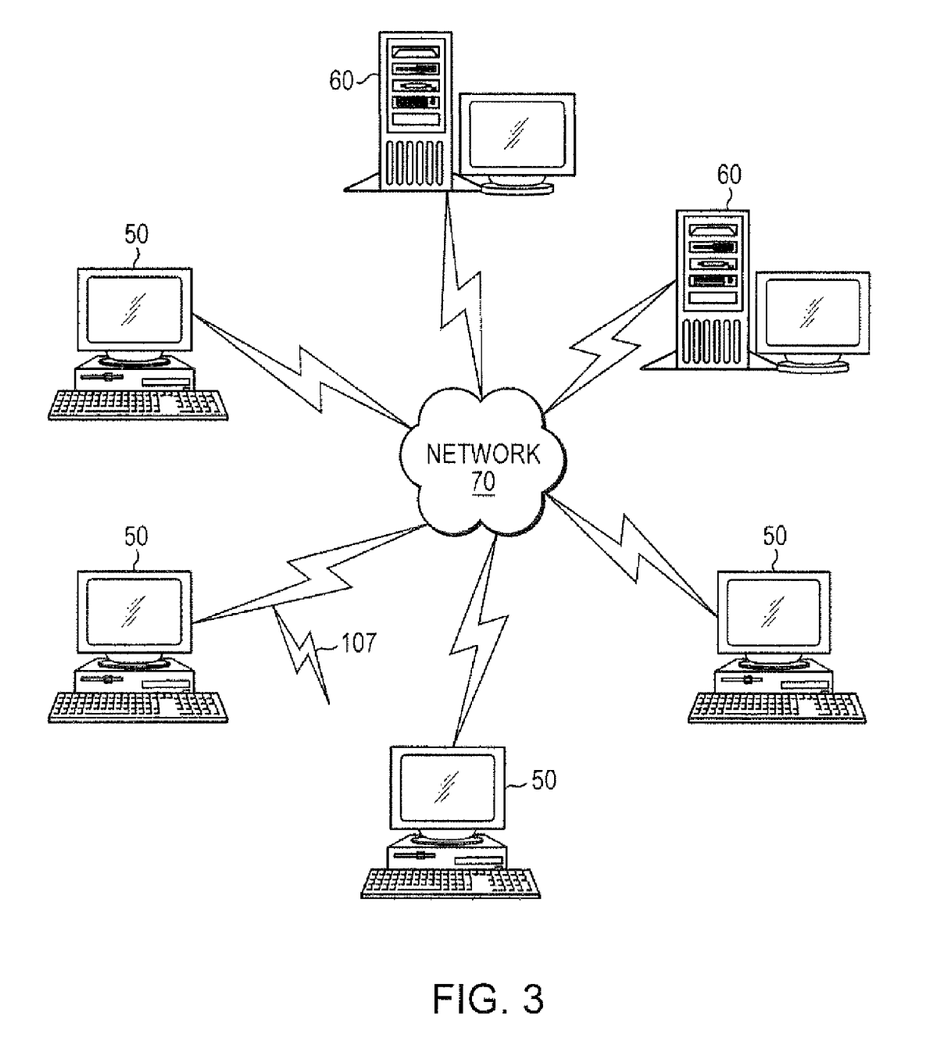
FIG. 3 is a schematic view of a computer network environment in which embodiments of the present invention are implemented.

FIG. 3 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 4:
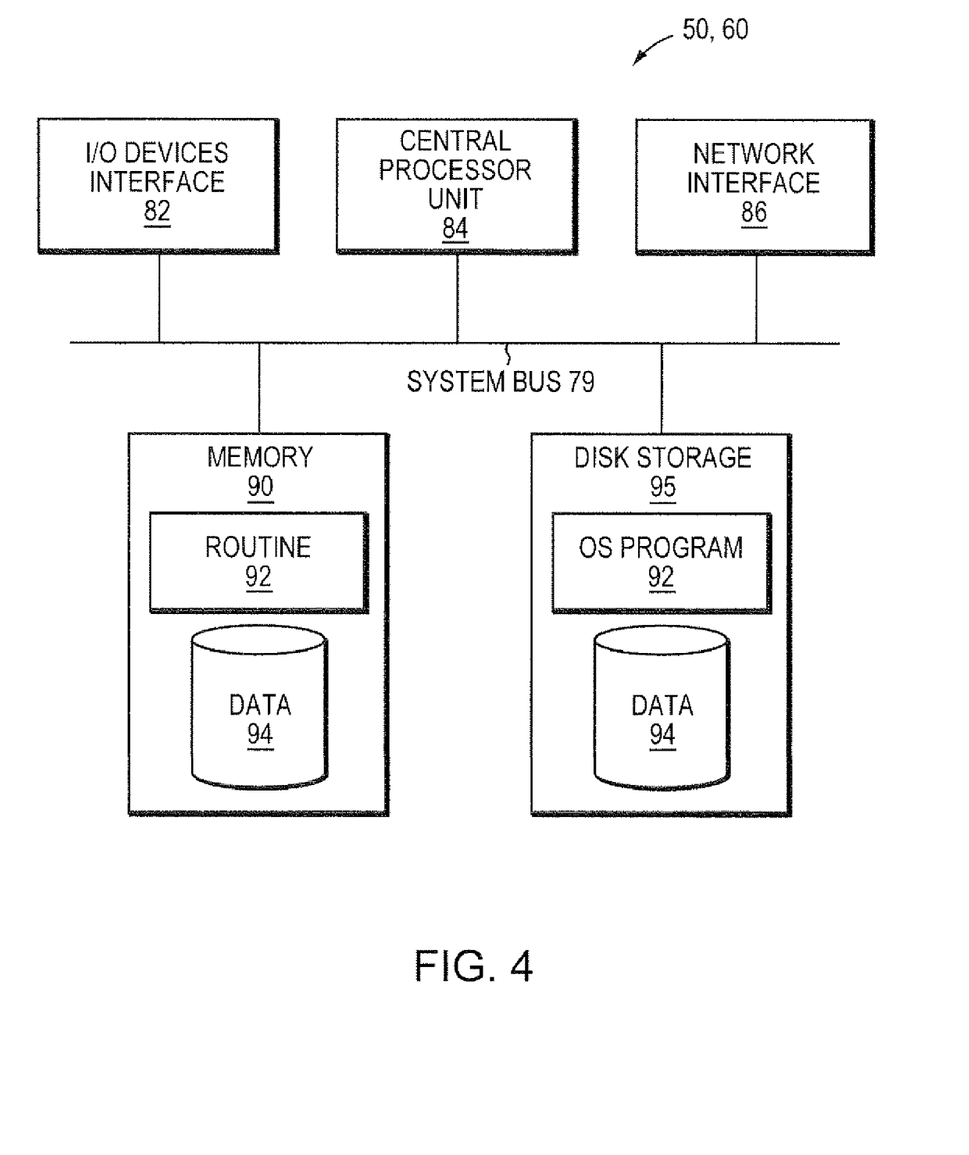
FIG. 4 is a block diagram of a node in the computer network of FIG. 3.

FIG. 4 is a diagram of the internal structure of a computer (e.g., client processor/device 50 or server computers 60) in the computer system of FIG. 3. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 3). Memory 90 provides volatile storage for computer software instructions 92 and data 94 used to implement an embodiment of the present invention (e.g., revision manager 25, and code for generating project view 35 and per asset timeline screen view 37 with asset revision history 52 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 3 and 4 are for purposes of illustration and not limitation of the present invention.

Further, various color coding or color schemes may be applied to the various above described screen views 35, 37. For example, in one embodiment branch lines 29 are displayed in yellow, tags 27 are displayed in grey particular polygon shape, trunks 26 are red lines, assets are represented by grey dots 30, annotations are indicated by white circles 40 and performance indicators 28 are respective shades of other colors. Other colors or shades and other combinations of colors, shapes and line drawing (e.g., solid lines, broken lines, dotted lines, etc) are suitable.

APPENDIX I

Visual Grammar

This is an enumeration of the different branch and tag states and how the application will render them. The revision manager is not the only subversion client, so there are a number of cases where the revision manager must be able to display a repository state even if the revision manager is not designed to put the repository into that state. Each case enumerated below includes a brief description of the state, an image of what this looks like graphically, and svn command-line examples of how the repository can be put into the state for that case. In addition, each case may include SVN Log entries that correspond to the state.

Overview

The project view displays the trunk, branches, and tags in a project. It also shows each change of state (rendered as dots, each of which represents a revision) as well as performance indicators (optionally associated with tags). The view has two scaling modes: temporal and sequential. In sequential mode, the left-to-right increments correspond to changes in state. In temporal mode, the left-to-right increments correspond to steps in time. Both modes show both types of changes, i.e. sequential changes to state and order of changes over time.

The per-asset view displays a revision history and asset contents. The revision history is a line with dots. Each dot represents a change of state to the asset (a revision point). For a given location, there is one and only one timeline. Each timeline may be rendered in one of two modes: show all and location only. In show all mode, every revision is show for the asset, even if the revision happened to the asset before it was copied to the viewed location. In location only mode, display is limited to revisions made when the asset was in the viewed location.

There are two types of assets: containers and non-containers. Files are examples of non-container assets, for example a spreadsheet or a text document. Directories are examples of container assets.

Overview—Constructs
revision head tag with
indicators
working copy
indicators
asset
copy
branch Each line represents a branch. The trunk and each branch contain a hierarchy of assets; each trunk/branch line is a handle to the asset hierarchy.

change set The list of changes at a specific revision. The list contains the path of each item that was modified (e.g. svn+ssh://host/repo/dir/file.txt) as well as an indication of what kind of change was made (e.g. added, removed, modified). Also referred to as changed paths.

commit point Each commit point represents a change of state to one or more assets at that point in time. The enumeration of changes is called a change set.

head The latest state of an asset or set of assets. The block at the end of each trunk/branch is a handle for the head of that trunk/branch. Selecting this handle is equivalent to "give me the latest stuff", which is not necessarily the same as saying "give me the latest revision".

performance indicators Each tag may have one or more performance indicators associated with it. Each block is a single metric. Each metric may have one or more asset groups associated with it. The colors in the blocks correspond to the metric score. Arrows in the block indicate whether the score has gone up or down since the previous tag with that metric. Grey blocks in the blocks indicate a change to the preference curves used to generate the metric score.

revision A specific state in the repository.

tag Each tag is a hierarchy of assets. Once created, tags are typically read-only.

working copy indicator The working copy indicator is a handle to a working copy. It provides a link to the working copy or a link to status about the differences between a working copy and the branch/trunk/tag from which it was checked out.

Overview—Status Indicators

The working copy status indicates the status of items on the file system relative to items in the repository. The status indicators include:

marked for addition marked for removal has conflicts has changes contains items that have changes no changes The repository status indicates the status of items in the repository relative to the items on the file system. The status indicators include:

has changes contains items that have changes no changes

Project View Cases

The cases enumerated below are organized into groups: one for asset copies, one for branches, and one for tags.

Asset Copy—From One Branch to Another

Copy one or more assets from one branch to another. This operation may replace or add to the assets in the destination branch.

--- svn copy REPO/PROJECT/trunk/dir/ REPO/PROJECT/branches/b1/dir
svn copy REPO/PROJECT/trunk/asset REPO/PROJECT/branches/b1
log goes here

---

Asset Copy—from One Branch to Itself

Copy one or more assets from one commit point on a branch to itself. This is equivalent to restoring one or more assets to a previous state, or reorganizing assets within a branch.

```
svn copy REPO/PROJECT/branches/b1/dir/@3 REPO/PROJECT/
   branches/b1/dir
svn copy REPO/PROJECT/branches/b1/asset@3 REPO/PROJECT/
   branches/b1
svn copy REPO/PROJECT/branches/b1/asset@3 REPO/PROJECT/
   branches/b1/dir
log goes here
```

Asset Copy—From External Source

Copy one or more assets from a source outside of a project onto a branch within a project.

```
svn copy REPO/PROJECTA/trunk/dir/ REPO/PROJECTB/branches/b1/dir
svn copy REPO/PROJECTA/trunk/asset REPO/PROJECTB/branches/b1
log goes here
```

Asset Copy—Mixed Sources

Copy one or more assets from both internal and external sources.

```
not possible from command line
log goes here
```

Branch Create—Copy from Source within Project

Create a branch by copying one or more assets from a location within the project.

```
svn copy REPO/PROJECT/trunk/ REPO/PROJECT/branches/b1
svn copy REPO/PROJECT/branches/b1/ REPO/PROJECT/branches/b2
log goes here
```

Branch Create—Copy from Source Outside Project

Create a branch by copying one or more assets from a location outside a project.

```
svn copy REPO/PROJECTA/trunk/ REPO/PROJECTB/branches/b1
svn copy REPO/PROJECTA/branches/b1/ REPO/PROJECTB/branches/b2
log goes here
```

Branch Create—Copy from Multiple Sources

Create a branch by copying one or more assets from a location outside a project as well as one or more assets from a location within a project.

```
cannot be done via command line
log goes here
```

Branch Create—Create Multiple Branches

Create more than one branch in a single operation.

```
cannot be done via command line
log goes here
```

Branch Create—Create Branch by Making a New Directory

Create a branch by creating a new directory.

```
svn mkdir REPO/PROJECT/branches/b1
log goes here
```

Branch Delete

Delete a branch.

```
svn rmdir REPO/PROJECT/branches/b1
log goes here
```

Branch Unknown

A branch may have no history associated with it, but does have commits. The branch origin is unknown.

Branch Restore

Restoration of a branch is accomplished by a delete then a create. This is not a new configuration, but rather a composition of two others (delete and create). Here are some examples of what restoration of a branch looks like.

Branch Replace

Replacing a branch is the same thing as either an asset copy (when some or all branch contents are replaced) or a delete-create (when a branch is deleted then replaced by a new branch with the same name).

Tag with Commit

Normally a tag is associated with a commit point and a branch.

```
svn copy REPO/PROJECT/trunk/@3 REPO/PROJECT/tags/tag
log goes here
```

Tag without Commit

A tag may be associated with a branch but not be associated with a specific commit point.

```
svn copy REPO/PROJECT/trunk/ REPO/PROJECT/tags/tag
log goes here
```

Dangling Tag

A tag may be created by copying assets from outside a project.

```
svn copy REPO/PROJECTA/trunk/ REPO/PROJECTB/tags/tag
log goes here
```

Tag Delete

A tag may be deleted. A deleted tag is rendered as a ghosted tag.

```
svn delete REPO/PROJECT/tags/tag
log goes here
```

Multiple Tags at Same Commit

There may be more than one tag associated with a single commit point. This can happen either by overwriting a tag or by delete-then-new tag. In these cases, only the latest tag is displayed.

```
svn copy REPO/PROJECT/trunk/ REPO/PROJECT/tags/taga
svn copy REPO/PROJECT/trunk/ REPO/PROJECT/tags/tagb
svn delete REPO/PROJECT/tags/tag
svn copy REPO/PROJECT/trunk/ REPO/PROJECT/tags/tag
   log goes here
```

Asset Timeline Cases

Asset

Asset Deleted

The asset was deleted and is no longer contained in the head.

Asset Deleted then Restored

The asset was deleted then restored.

What is claimed is:

1. A computer apparatus for managing engineering product revisions, comprising:
    a repository in memory configured to store one or more assets, for each asset the repository storing respective revisions of the asset, different assets forming different engineered products; and
    a digital processor operatively coupled to the memory, the processor configured to execute a revision manager and track changes made to a given asset of the repository, each change made to the given asset resulting in a respective revision of the given asset, and the revision manager providing a project view displayed to a user and illustrating in the project view the given asset or at least one of the respective revisions of the given asset, the displayed project view further including performance indicators corresponding to the given asset and the respective revisions of the given asset stored in the repository, there being displayed simultaneously in the project view a different performance indicator for each of the given asset and different respective revisions of the given asset in the repository, each performance indicator as displayed in the project view representing a respective performance rating and implementing an access link to the corresponding one of the given asset and the respective revisions of the given asset stored in the repository,
    wherein the performance indicators represent performance ratings, different performance ratings having different metrics; and
    wherein the revision manager further provides in the project view an indication of a change in metric of performance ratings represented by the performance indicators.

2. The apparatus of claim 1, wherein the performance indicators are color coded.

3. The apparatus of claim 1, wherein the performance indicators include an indication of relative performance metric score such that a performance indicator of one asset indicates a respective performance metric score relative to a performance metric score of another asset.

4. The apparatus of claim 1 wherein the performance indicators have graphical form and are moveable and copyable in a graphical user interface, said copying of a performance indicator in the user interface effectively copies corresponding assets in the repository.

5. The apparatus of claim 1 wherein each performance indicator is associated with a respective set of assets, and the revision manager-provides zero, one or more performance indicators in the project view for respective asset state changes of the set of assets as a whole instead of on a per asset basis.

6. The apparatus of claim 5, wherein plural performance indicators for the set of assets is graphically displayed as a time ordered series of asset revisions in the project view, such that the project view displays a history of changes to the set of assets.

7. A computer implemented method for managing engineered product revisions comprising the steps of:
    in a digital processor:
        holding one or more assets in a repository, for each asset, holding respective revisions of the asset in the repository, different assets forming different engineered products;
        tracking changes to assets of the repository including tracking changes to a given asset, each change made to the given asset resulting in a respective revision of the given asset, each of the resulting respective revisions being held in the repository;
        generating and displaying to a user a project view, the displayed project view illustrating the given asset or at least one of the respective revisions of the given asset, the displayed project view including a plurality of performance indicators corresponding to the given asset and the respective revisions of the given asset held in the repository, there being displayed a different performance indicator for each of the given asset and the different respective revisions of the given asset in the repository, each performance indicator as displayed in the project view representing a respective performance rating of the corresponding one of the given asset and respective revisions of the given asset held in the repository, and each performance indicator implementing an access link to the corresponding one of the given asset and respective revisions of the given asset held in the repository, wherein the performance indicators represent performance ratings, different performance ratings having different metrics; and
        further displaying in the project view an indication of a change in metric of performance ratings represented by the performance indicators.

8. The method as claimed in claim 7 wherein the performance indicators are color coded.

9. The method as claimed in claim 7 wherein the performance indicators include an indication of relative performance metric score such that a performance indicator of one asset indicates a respective performance metric score relative to a performance metric score of another asset.

10. The method of claim 7, wherein the performance indicators have graphical form and are moveable and copyable in a graphical user interface, said copying of a performance indicator in the user interface effectively copies corresponding assets in the repository.

11. The method of claim 7, wherein each performance indicator is associated with a respective set of assets, and the revision manager provides zero, one or more performance indicators in the project view for respective asset state changes of the set of assets as a whole instead of on a per asset basis.

12. The method of claim 11 wherein plural performance indicators for the set of assets is graphically displayed as a time ordered series in the project view, such that the project view displays a history of changes to the set of assets.

13. A computer apparatus for managing engineering product revisions, the computer apparatus comprising:
- a digital processor configured to execute a revision manager and track changes made to assets of a repository in a system managing engineering product revisions, each change made to a given asset resulting in a respective revision of the given asset, the repository holding one or more assets including the given asset, for each asset the repository holding respective revisions of the asset, different assets forming different engineered products; and
- a display configured to display to a user a project view generated by the revision manager and the displayed project view illustrating the given asset or at least one of the revisions of the given asset, the displayed project view including plural performance indicators corresponding to the given asset and the respective revisions of the given asset held in the repository, there being displayed a different performance indicator for each of the given asset and the different respective revisions of the given asset in the repository, each performance indicator as displayed in the project view representing a performance rating of the corresponding one of the given asset and respective revisions of the given asset held in the repository, and each performance indicator implementing an access link to the corresponding one of the given asset and respective revisions of the given asset held in the repository;
- wherein the performance indicators represent performance ratings, different performance ratings being based on different metrics; and
- wherein the revision manager further provides in the project view an indication of a change in metric of performance ratings represented by the performance indicators.

14. The computer apparatus as claimed in claim 13 wherein the performance indicators are color coded.

15. The computer apparatus of claim 13, wherein the performance indicators include an indication of relative performance metric score such that a performance indicator of one asset indicates a respective performance metric score relative to a performance metric score of another asset.

16. The computer apparatus of claim 13 wherein the performance indicators have graphical form and are moveable and copyable in a graphical user interface.

17. The computer apparatus of claim 13 wherein plural performance indicators for a set of assets is graphically displayed as a time ordered series in the project view, such that the project view displays a history of changes to the set of assets.

* * * * *